UNITED STATES PATENT OFFICE.

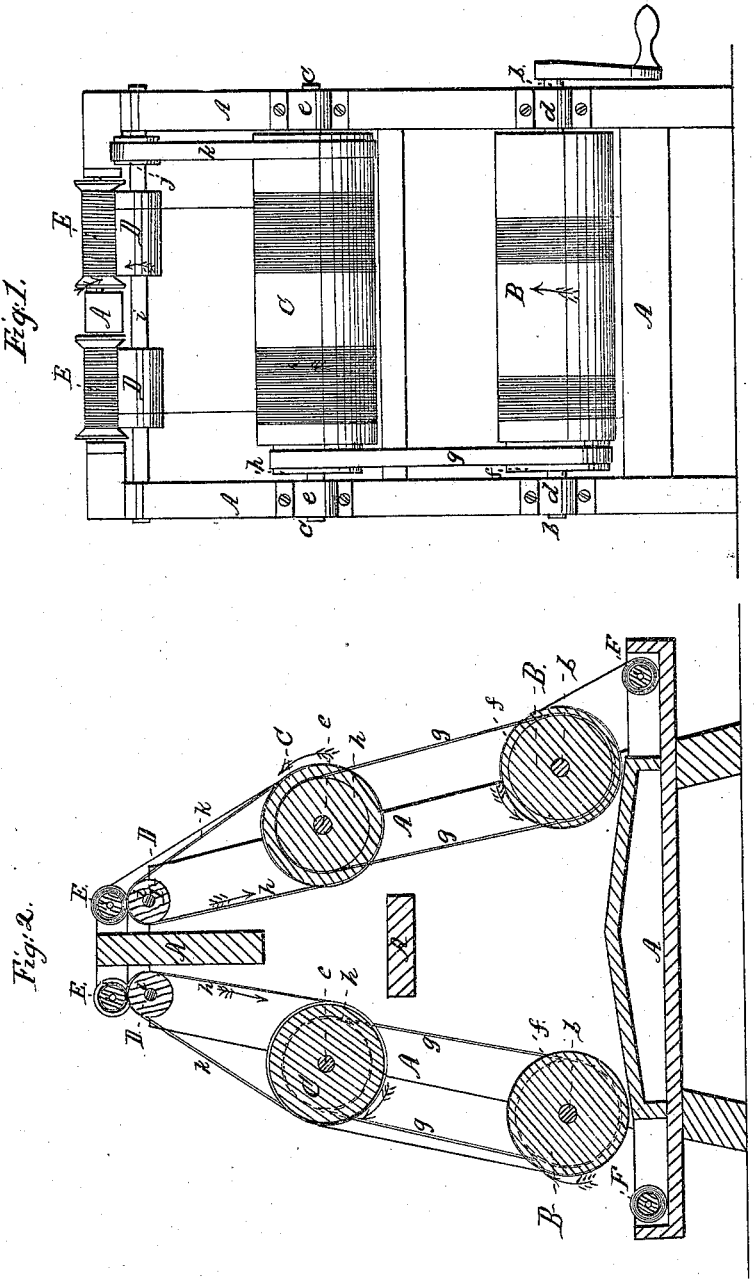

GOODRICH HOLLAND, OF WILLIMANTIC, CONNECTICUT.

IMPROVEMENT IN MACHINES FOR STRETCHING SILK, &c.

Specification forming part of Letters Patent No. 58,256, dated September 25, 1866.

*To all whom it may concern:*

Be it known that I, GOODRICH HOLLAND, of Willimantic, in the county of Windham and State of Connecticut, have invented a new and useful Improvement in Machinery for Stretching Silk; and I do hereby declare that the following is a full, clear, and exact description of the same, reference being had to the accompanying drawings, forming part of this specification, in which—

Figure 1 is a front or longitudinal elevation of a silk-stretching machine. Fig. 2 is a vertical section of the same at right angles to Fig. 1.

Similar letters of reference indicate corresponding parts in both figures.

This invention relates to machinery for stretching silk according to the invention which is the subject of Letters Patent No. 42,153, granted April 5, 1864, to I. E. Atwood and myself.

The machines heretofore used for this purpose have been mostly of two kinds. The first had a number of horizontal spindles arranged side by side at right angles to the length of the machine, and carrying stretching-bobbins, each bobbin having a separate spindle and driving-band, making it somewhat complicated; and the second one had a number of stretching-pulleys arranged upon the same shaft, and coupled therewith by clutches, and this was liable to the same objection as the first in respect of complexity.

The object of my invention is to obtain a more simple machine for the purpose; and to this end it consists in a novel arrangement of stretching-drums, each capable of stretching two or more threads at a time, whereby the desired result is effected.

To enable others skilled in the art to make and use my invention, I will proceed to describe it with reference to the drawings.

A is the framing of the machine, of any suitable length, according to the number of threads to be stretched at once, and of convenient height, width, and form. This framing may have a complete system of stretching and winding apparatus on each side, as represented in Fig. 2, or on one side only. Each set of stretching apparatus is composed mainly of two long horizontal stretching-drums, B C, and bobbins for supplying the silk to be stretched and taking it up when stretched. The two stretching-drums, of wood or other material, are fast upon shafts $b\ c$, and arranged one above the other lengthwise of the framing, and extend from end to end of the latter, as shown in Fig. 1, their shafts being supported and working in fixed bearings $d\ e$ on the ends of the framing, and the two are so connected by pulleys $f\ h$ and a belt, $g$, or by gearing, that rotary motion transmitted from the lower one, B, to the upper one, C, will cause the surface of C to move sufficiently faster than that of B to produce the necessary stretch of the silk as it is wound from the latter to the former. The power to drive the machine may be applied to the shaft $b$ of the lower drum.

Above the drum C and parallel with it and B there is a shaft, $i$, which extends the whole length of the framing, and works in bearings in the ends thereof and in as many intermediate bearings provided thereon as may be necessary; and fast on this shaft there are at equal distances apart a number of cylindrical rollers, D D, corresponding with the number of threads to be stretched at a time. The said shaft $i$ is furnished near one end with a pulley, $j$, of suitable size, which receives a belt, $k$, running on the drum C, for the purpose of transmitting rotary motion from the said drum to the said shaft to drive the said shaft and rollers at a suitable speed. Above each of the rollers D there is arranged a bobbin, E, the journals of which are so placed in suitable bearings in the framing A that the portion of the said bobbin which receives the silk will rest upon the roller with the silk in contact therewith. Below the roller B there are provided in the framing A suitable bearings for the reception of the bobbins F, upon which the thread or silk to be stretched is wound before being introduced to the machine. The silk is represented in blue color.

The operation of the machine is as follows: The bobbins F, containing the thread to be stretched, are placed in the bearings in the lower part of the framing below the drum B, and the ends of the silk, having been slightly moistened, so as to stick to the said drum, are laid thereon. The machine is then set in motion and the threads are wound onto the drum B, the bobbins F being rotated to let off the threads by the tension of the threads themselves. When the threads are wound from all the bobbins the drums are stopped, and the ends of the threads are moistened and placed on the drum C, and the drums are then again set in motion to unwind the threads from the drum B and wind them on the drum C, during which operation the stretching is effected by the greater velocity of the surface of the drum C. When the threads have all been wound onto the drum C the drums are again stopped, and the ends of the threads, having been again moistened, are conducted over the rollers D and attached to the bobbins E, which are then placed in the upper bearings above the rollers D, and the drums being again set in motion, the threads are wound off from the drum C onto the bobbins E.

While the last-mentioned operation is going on new threads are being wound onto the drum B, to prepare them for being stretched, and hence half of the time that would be occupied if the winding on of the threads to drum B and winding them off from the drum C were performed separately is saved.

The full bobbins E and empty bobbins F are removed to permit the introduction of full bobbins F and empty bobbins E during each stretching operation, so that after the stretching has been performed a new supply of thread may be in readiness to be wound onto the drum B, and bobbins E may be ready to receive the stretched thread from the drum C.

What I claim as my invention, and desire to secure by Letters Patent, is—

The arrangement of the two stretching-drums B C, the bobbins F F, or their equivalents, for delivering the unstretched silk to the first stretching-drum, and the take-up apparatus for taking up the stretched silk, substantially as herein set forth.

GOODRICH HOLLAND.

Witnesses:
J. H. HOLLAND,
S. L. BURLINGHAM.